Sept. 20, 1938.  W. M. BAILEY  2,130,532
ELECTRICAL CONDENSER
Filed Jan. 16, 1933

Inventor
William M. Bailey
By Edwards, Bower & Pool
Attorneys

Patented Sept. 20, 1938

2,130,532

UNITED STATES PATENT OFFICE 2,130,532

ELECTRICAL CONDENSER

William M. Bailey, White Plains, N. Y., assignor to Dubilier Condenser Corporation, New York, N. Y., a corporation of Delaware Application January 16, 1933, Serial No. 651,969

6 Claims. (Cl. 175—315)

This invention relates to improvements in electrical condensers and methods of making such condensers, particularly those of the electrolytic type comprising metallic foil electrodes with insulating film.

One object of the invention is to increase the effective electrode surface of condensers with a corresponding increase in dielectric in a given space, thus obtaining an increase in capacity. One of the elements controlling the capacity therein is the surface area of the electrodes and another the area of the dielectric between the electrodes. This object is achieved primarily by providing an electrode foil having novel characteristics distinguishing it from the smooth metallic foil, such as the tin and aluminum foil of the prior art; and by the provision of a similar novel dielectric distinguished from the smooth dielectric film hitherto known.

The novel characteristics may be described generally as involving the surface of the foil which, looked at from one face is formed with relatively minute projections and from the other face with corresponding depressions, as distinguished from an ordinary smooth surface. While this surface may be formed in any desirable manner, as by graining, burring, sand-blasting or mesh-pressure, I prefer to form it by a rolling process, producing a surface which may be said to be embossed. This term "embossed" will hereinafter be employed in the specification and claims for the sake of brevity as describing the foil, but it is understood as comprehending all surfaces however formed which have the specified novel characteristics as contrasted with the smooth surface of the electrode or the insulating film heretofore used. This smooth surface of the prior art, both on the foil and the insulating film, is inherent, since even if the smooth foil sheet or strip be corrugated or bent back and forth resulting in reduction of the over-all length, the surface of the sheet would still be smooth. By the employment of the novel embossed foil in accordance with this invention, the resultant effective surface area may be increased to a much greater extent both of the electrode and the dielectric or insulating film as compared with a smooth faced foil of corresponding length and width. In actual practice, I have found from 20% to 40% increase. It will be understood that by applying a thin dielectric film to the embossed foil in conformity with the contour thereof the surface area of the film is increased correspondingly with the surface area of the foil, with resultant increased capacity as compared with a film applied to a smooth surface as in the prior art. The resultant novel condenser, preferably of the electrolytic type, has a greatly increased capacity for a given size and bulk as compared to that used in the prior art.

A further object of the invention is to provide a condenser which is less subject to mechanical and electrical injury, particularly as respects the dielectric film, during the manufacturing of the condenser unit. Usually the rolled-type condensers are made up by winding electrodes which may be partially or entirely pre-treated and which may have a fibrous spacing material, as gauze, between the electrodes in addition to the insulating film. Hitherto, the known dielectric films were easily broken or cracked during this mechanical formation, with the result that excessive leakage and comparative early deterioration took place.

With the improved dielectric film of the present invention, such dangers are largely eliminated. The dielectric film forming on the foil adheres strongly to it and follows closely the surface formation of the foil, resulting in a closer and more nearly integrated connection between the foil and film, as well as in a firmer and more uniform texture of the film itself. When the improved integrated foil and film are subjected to the usual mechanical winding operation in producing the condenser, or when they are otherwise bent or curved, the resulting tension and compression strains are maintained in substantial balance, and breaking or cracking is greatly lessened. Moreover, the bare spots characteristic of smooth foils and dielectric films are substantially obviated. In the subsequent final reforming or setting operation these spots result in voids which cause deterioration and losses to which an electric condenser is subject when connected to a circuit.

Furthermore, the embossed dielectric of this invention provides small pockets for the electrolyte which is applied and absorbed by a porous carrying medium, usually gauze, during the impregnating operation. In the finished condenser the electrolyte in these pockets or wells constitutes a reserve supply; while the embossed dielectric results in a more even distribution and retention of the electrolyte throughout the whole surface of the dielectric.

Some of the important practical advantages resulting from these last noted features of the invention may be referred to. In the production of electrolytic condensers they are wound up, impregnated and assembled in a container or can, after which they are ordinarily subjected to a final forming or setting operation, the time of which varies but is usually a matter of hours, varying from one to eight, with the smooth foil and film. In practice the condensers must be formed below a leakage of one-half mil per eight mfd. 500 volts. With a condenser employing my improved foil and film the leakage during the final forming operation drops down to one mil in something like fifteen minutes, and to one-half mil in twenty minutes. This contrasts with the one to eight hours hitherto found necessary to produce the desired leakage, the increased time resulting in excess generation of heat and injury to the condenser, as well as slowing the operation. The manufacturing cost when the invention is employed is decreased because of the minimum time treatment, and furthermore this time treatment is more regular and consistent, as contrasted with a variation of from one to eight hours with prior constructions.

An additional object is to provide a manufactured article less sensitive to mechanical shocks with resultant breakage of elements, including the dielectric film.

It has been found in practice that the embossings should be of minute size; as for example, with a foil which prior to embossing is two or three thousandths of an inch in thickness, the overall thickness of the embossed foil will be from six to eight thousandths of an inch, or approximately three times the original thickness. Preferably the embossings are uniform and of the smallest dimensions which can be obtained, resulting in an increased flexibility and uniformity of texture.

The invention will be specifically described in connection with the accompanying drawing, wherein Fig. 1 is a fragmentary face view of a foil sheet or strip embodying the invention, drawn to a greatly enlarged scale;

Referring to Figs. 1-4, the foil sheet shown therein and designated as 10 is of a style adapted for use as an electrode in an electrolytic condenser. The foil sheet 10 is of thin metallic material, being made of aluminum or other suitable metal. It is provided with prominences or embossings 11 which on the opposite side form depressions, pockets or cavities indicated at 12. A simple method of producing this embossed foil sheet from a smooth sheet comprises subjecting the smooth foil to a rolling operation, using a roll or rolls provided with suitably shaped projections or devices. Alternatively a screen of suitable pattern may be placed upon the smooth foil and both subjected to mechanical pressure to give the foil the desired conformation or contour, but it is to be understood that any suitable method may be employed for forming or producing the novel foil sheet or article.

Figure 1:
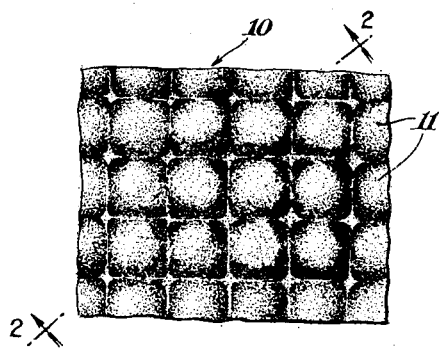
Figure 2:
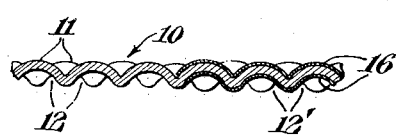
Fig. 2 is a sectional view taken on the section line 2—2 in Fig. 1 and also showing the dielectric film on part of the foil.

For clearness of illustration the novel foil sheet as shown in Figs. 1 and 2 has been drawn on a greatly magnified scale, approximately in the ratio of fifty to one. This will be appreciated by comparison with Fig. 4 which shows the sheet drawn to substantially actual size. The improved foil sheet under ordinary inspection has a roughened appearance as contrasted with the prior smooth sheet, and is somewhat thicker, but it is quite flexible, being wound or curved from its flat or plane formation as readily as the smooth sheet and this without substantial derangement of its structure.

Figure 3:
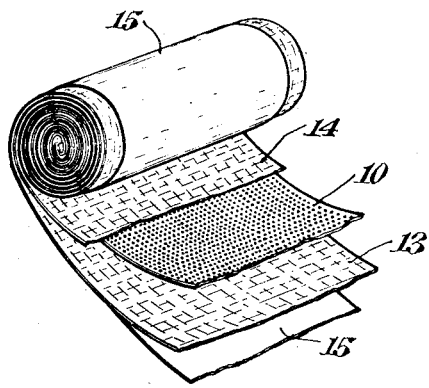
Fig. 3 is a perspective view of a partly-wound condenser embodying the invention and drawn on a substantially normal scale.

Fig. 3 illustrates a condenser nearly completely wound and employing a novel foil sheet in accordance with the invention. In the condenser of Fig. 3, two strips of gauze 13 and 14, or other porous medium suitable for impregnation with a liquid electrolyte, are interwound with foil strips or sheets 10 and 15, the sheet 10 being of the embossed type as described, and the sheet 15 being a smooth metallic sheet which may be and preferably is made of aluminum. The foil sheet 10 serves as a film electrode, being provided with a suitable chemically formed dielectric film as indicated at 16 (Fig. 2). As has been explained, the solid dielectric film conforms to the contour of the embossed foil and is closely adherent thereto throughout, providing pockets 12' which may receive the electrolyte composition.

The condenser illustrated in Fig. 3 and wound into a roll as shown, may be used in direct current circuits with the embossed filmed foil 10, 16 acting as the anode, and the smooth foil sheet or strip 15 serving as the cathode. It is to be understood that instead of employing a single embossed and filmed foil strip 10 as illustrated, two filmed and embossed foil strips may be employed interleaved with strips of gauze for a condenser used in alternating current circuits or in direct current circuits without regard to the polarity connection.

In practice it has been found that with a condenser embodying an embossed foil strip in accordance with the invention a theoretical increase of 50% and an actual increase of from 30% to 40% in capacity is obtained, as compared with prior condensers employing smooth foil strips of the same overall dimensions or surface area. A numerical example will show this resultant increase in capacity. If a metallic sheet of .003 inch thickness is formed or embossed in accordance with the invention until the total thickness approximates three times that of the original smooth sheet and is used as the positive foil carrying dielectric film in a wound condenser for use in direct current circuits, the other co-operating electrode being a smooth foil sheet, the total increased thickness due to the embossing will be small compared with the total thickness or diameter of the condenser, as will be clear from the following. A filmed foil sheet of the ordinary smooth type is approximately .003 of an inch thick. Each layer of gauze is approximately .008 of an inch in thickness or .016, and the smooth foil sheet, as 15, is approximately .004 of an inch thick. This makes a total thickness of all the layers amounting to .023 of an inch. If the novel sheet of the invention, approximately three times the original thickness of the smooth foil from which it was formed, or .009 of an inch thick, be substituted in the condenser for the smooth filmed foil sheet, the total thickness will then be .029 of an inch. In other words the total increased thickness for each turn or ply will equal the difference between .029 and .023 inch, that is, .012 of an inch. Ordinarily there are about eight turns or windings in a condenser having an outside diameter of one inch, so that in sum there will result by the employment of the invention a total increase in diameter of .096 of an inch equal to about 10% increase only, but with a resultant increase in capacity of approximately 40% to 50%.

Figure 4:
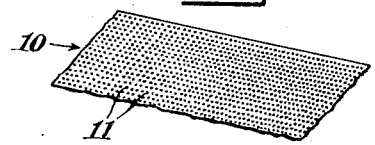
Fig. 4 is a fragmentary perspective view of the foil shown in Fig. 1 but drawn to a normal scale.
Figure 5:
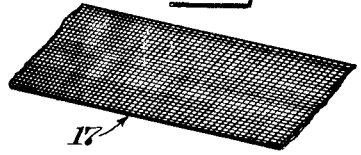
Figs. 5 and 6 are perspective views of different forms of foil strips embodying the invention.
Figure 6:
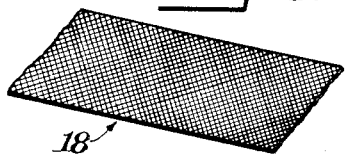

It will of course be understood, as has been indicated, that the invention is not restricted to any particular type of embossing, nor to any particular arrangement of the embossings relatively to each other. In Figs. 1–4 the embossings are substantially regularly curved projections or protuberances and are arranged in parallel rows both lengthwise and crosswise of the sheet or strip, but they may be arranged in any other pattern or fashion as may be found suitable and they may be also of a different type from that illustrated in Figs. 1–4, as shown in Figs. 4 and 5. Fig. 5 illustrates schematically a sheet 17 of a pattern in which the embossings are arranged in criss-cross fashion and of a somewhat different shape or contour. Fig. 6 shows a foil sheet 18 with the criss-crossing rows angularly related to the side edges of the foil sheet, instead of parallel thereto as in the above showing.

Besides the described and illustrated modifications, the invention of course is capable of other variations and modifications within its scope, and may be embodied in other styles or types of electrical, and particularly electrolytic, condensers; and the dielectric film on the embossed foil may be of any suitable composition and produced by any desired process, this also applying to the porous medium or gauze and to the electrolyte with which it is impregnated.

I claim:

1. An electrolytic condenser foil electrode containing a multiplicity of small closely spaced indentations in a retiform arrangement extending across the face of the electrode, adjacent indentations having common boundary portions in the electrode narrower in width than the width of the indentations, the boundaries of the indentations being merged to form a screen network on the electrode, each indentation emerging from the small individually bounded areas defined by the screen network, the surfaces of each indentation and associated boundaries being substantially smooth whereby no sharp portion thereof may pierce an adjacent soft layer, a dielectric film conforming to the contour of the multiplicity of indentations and boundaries thereof to provide an effective capacitive surface for the foil substantially greater than the surface area of a smooth flat foil of the same dimensions of length and breadth.

2. An electrolytic condenser comprising rolled juxtaposed flat elements including a foil electrode and an electrolyte contained therebetween, said foil electrode containing a multiplicity of small closely spaced indentations in a retiform arrangement extending across the face of the electrode, adjacent indentations having common boundary portions in the electrode merged to form a screen network on the electrode, each indentation issuing from the small individually bounded areas defined by the screen network, the surfaces of the indentation and associated boundaries being substantially smooth whereby no sharp portion thereof may pierce an adjacent soft layer, a dielectric film conforming to the contour of the multiplicity of indentations and boundaries thereof to provide an effective capacitive surface for the foil electrode substantially greater than the surface of a smooth flat foil of the same dimensions of length and breadth.

3. An electrolytic condenser comprising rolled juxtaposed flat elements and an electrolyte contained therebetween, one of said flat elements containing a multiplicity of small closely spaced protuberances in a retiform arrangement extending across the face of the element, adjacent protuberances having common boundary portions in the element merged to form a screen network on the element, each protuberance issuing from the small individually bounded areas defined by the screen network, said protuberance and boundaries coacting to form a multiplicity of pockets for storing corresponding quantities of said electrolyte therein to constitute a reserve electrolyte supply for the condenser, the surface of the protuberance and associated boundaries being substantially smooth whereby no sharp portion thereof may pierce an adjacent soft layer.

4. An electrolytic condenser comprising rolled juxtaposed flat elements including a foil electrode and an electrolyte layer adjacent the electrode, said foil electrode containing a multiplicity of small closely spaced indentations in a retiform arrangement extending across the face of the electrode, adjacent indentations having common boundary portions in the electrode narrower in width than the width of the indentations, the boundaries of the indentations being merged to form a screen network on the electrode, each indentation issuing from the small individually bounded areas defined by the screen network, the surfaces of the indentation and associated boundaries being substantially smooth whereby no sharp portion thereof may pierce said adjacent electrolyte layer, said indentations and boundaries coacting to form a multiplicity of pockets for storing corresponding quantities of said electrolyte therein to constitute a reserve electrolyte supply for the condenser, a dielectric film conforming to the contour of the multiplicity of indentations and boundaries thereof to provide an effective capacitive surface for the foil electrode substantially greater than the surface of a smooth flat foil of the same dimensions of length and breadth.

5. An electrolytic condenser comprising in combination a plurality of electrodes separated by a fibrous spacer, one of the electrodes having a multiplicity of small closely spaced indentations in a retiform arrangement extending across the face of the electrode, the boundaries of the indentations being merged to form a screen network on the electrode with each indentation emerging from a small individually bounded area defined by the screen network, the raised portions of the electrode being rounded to give extended area and to avoid perforating the intervening fibrous separator, and a dielectric film conforming to the contour of the multiplicity of indentations and boundaries thereof to provide an effective capacitive surface for the electrode substantially greater than the smooth surface of a flat electrode having the same dimensions of length and breadth.

6. An electrolytic condenser comprising in combination an anode and cathode electrode separated by an electrolyte impregnated fibrous spacer, the electrodes and intervening spacer being closely related to constitute a capacitive circuit and being formed into a compact unit, the anode electrode having a multiplicity of small closely spaced indentations in a retiform arrangement extending across the face thereof, the boundaries of the indentations being merged to form a screen network on the anode with each indentation emerging from a small individually bounded area defined by the screen network, the raised portions of the indented anode electrode being rounded to provide a substantially extended capacitive area and to avoid piercing the adjacent fibrous spacer through to the cathode electrode.

WILLIAM M. BAILEY.